June 23, 1959 A. S. PINKERSON Re. 24,661
BATTERY CARRIER
Original Filed Feb. 18, 1957
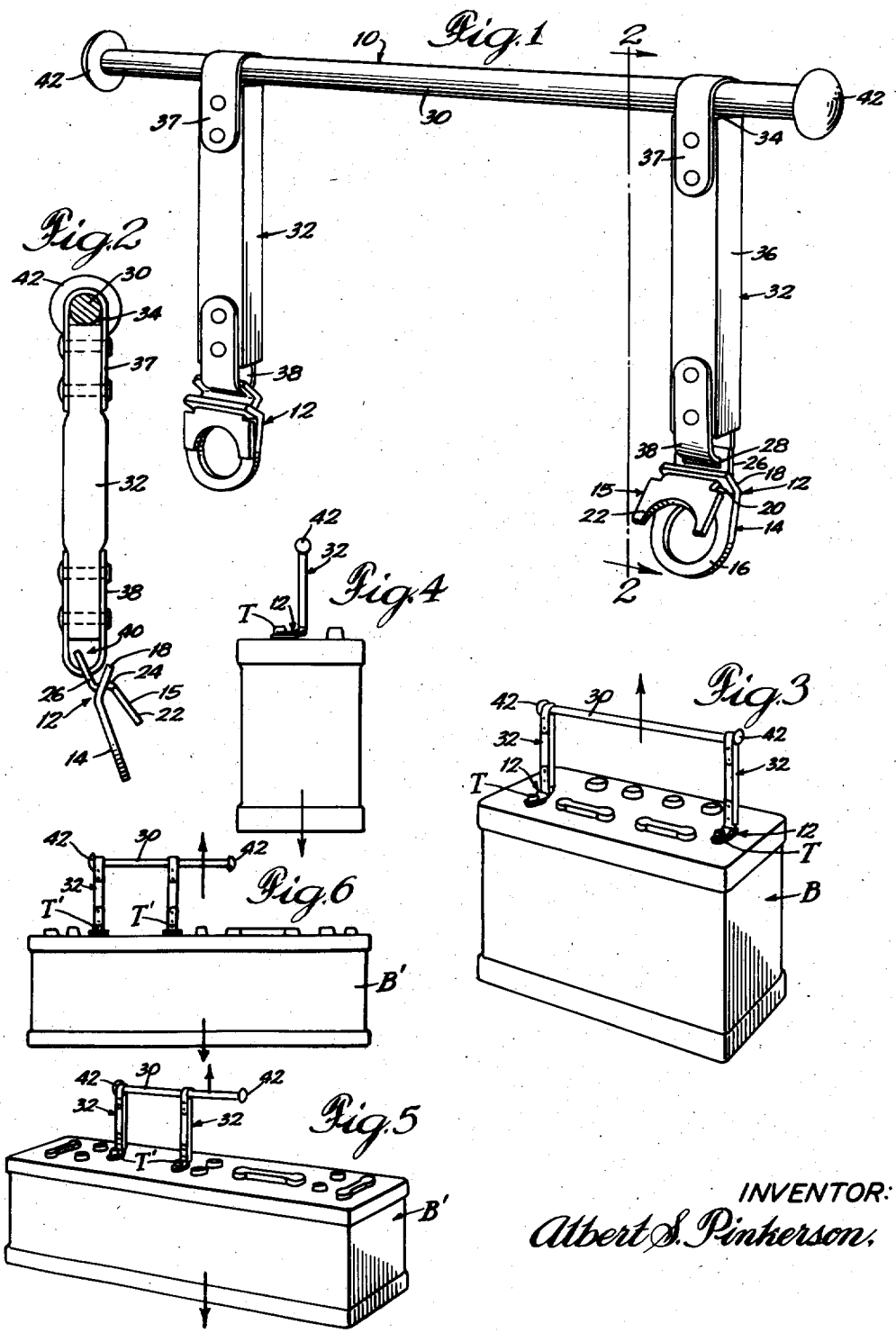
INVENTOR:
Albert S. Pinkerson.

United States Patent Office

Re. 24,661

Reissued June 23, 1959

24,661

BATTERY CARRIER

Albert S. Pinkerson, Glencoe, Ill., assignor to Berkson Products, Inc., a corporation of Illinois Original No. 2,816,791, dated December 17, 1957, Serial No. 640,876, February 18, 1957. Application for reissue March 10, 1958, Serial No. 720,518

5 Claims. (Cl. 294—92)

Matter enclosed in heavy brackets [ ] appears in the original patent but forms no part of this reissue specification; matter printed in italics indicates the additions made by reissue.

This invention relates to a battery carrier, and more particularly to a carrier for use with a battery wherein the battery's terminals are located in a plane offset from a plane through the battery's center of gravity.

For many years, electric batteries for use in automotive vehicles had their terminals disposed in a plane which passed through the center of gravity of the battery, and flexible battery carriers could easily grip the battery's terminals to provide a simple means for moving said batteries from one place to another.

However, with the advent of automotive electrical systems which require batteries of increased voltage, for some reason or another, batteries have been constructed with the terminals thereof located in a plane that is offset from a plane through the battery's center of gravity. The use of flexible battery carriers, of the type which have been heretofore known, with these newer batteries is undesirable, because they result in pitching or tilting of the battery, and any tilting of the battery may result in costly and damaging discharge of the acid solution from the battery.

The recent trend in batteries is not only toward arranging the battery's terminals displaced in one direction from the center of gravity of the battery, but certain types of batteries are now available where the battery's terminals are displaced in two directions, normal to each other, with respect to the center of gravity of the battery. This further complicates the problem of providing a simplified battery carrier.

Thus, one object of this invention is to provide a battery carrier for use with batteries wherein the terminals thereof are offset from a plane through the battery's center of gravity.

Another object of this invention is to provide a new and improved battery carrier which is useful both with a battery wherein the battery's terminals are offset in one direction from a plane through the center of gravity of the battery, and is useful also with batteries wherein the battery's terminals are offset in two directions, normal to each other, from the battery's center of gravity.

A further object of this invention is to provide a novel battery carrier that is characterized by its simplicity and inexpensiveness of construction and by its efficiency of performance.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a perspective view showing the new battery carrier;

Figure 2 is a cross-section view taken on line 2—2 of Figure 1;

Figure 3 is a perspective view showing the battery carrier of Figure 1 connected to the terminals of a battery which are offset in one direction from a plane through the center of gravity of the battery;

Figure 4 is an end elevation view of the battery and battery carrier of Figure 3;

Figure 5 is similar to Figure 3 and shows the battery carrier of Figure 1 connected to the terminals of a battery wherein the terminals are offset with respect to a longitudinal axial plane through the battery's center of gravity, and where said terminals are also offset with respect to a transverse axial plane through the battery's center of gravity; and Figure 6 is a side elevation view showing the battery carrier and battery of Figure 5.

Referring now to the drawings, there is shown in Figure 1 a battery carrier generally indicated at 10. The carrier includes a pair of battery-terminal grips, or gripping means, generally indicated at 12. Each terminal grip 12 is formed to define a terminal gripping portion and a connecting portion. As best seen in Figures 1 and 2, said terminal grip 12 includes a pair of members 14 and 15 arranged in scissor fashion. The member 14 defines a ring portion 16 for slipping over a battery's terminal, and an upwardly bent flange 18 which is apertured at 20. The member 15 defines a semi-circular portion 22, a neck portion 24 which extends through the slotted aperture 20, and a connecting portion 26. The connecting portion defines a slotted aperture at 28.

The carrier 10 includes an elongated rigid handle member 30 from which depend a pair of elongated support members each generally indicated at 32. Each support member 32 is arranged so that its upper end is connected to the handle 30 and its lower end is connected to the connecting portion 26 of a terminal grip 12.

The upper portion of each support member 32 is shaped to define an aperture 34 arranged for slidably receiving the handle 30. This arrangement permits of sliding movement of the support members 32 along the length of the handle 30. The lower end of each support member 32 defines a U-shaped strap which serves to provide a sliding pivot connection between the support member 32 and the terminal grip 12.

More specifically, each support member 32 includes an elongated segment, or portion 36, and an inverted U-shaped strap 37 is riveted, or otherwise appropriately secured, thereto to define the aperture 34. A second U-shaped strap 38 is riveted to the lower end of support segment 36, and the bight of the U is spaced from the portion 36 so as to provide a recess 40 within which the connecting portion 26 of the terminal grip may move, thus providing for sliding and pivoting of the terminal grip 12, relative to the support member 32, about an axis that is maintained substantially parallel to the longitudinal axis of the handle 30. The handle 30 is provided at both ends thereof with a head, or stop member, 42 for limiting the sliding movement of the support members 32 along the handle.

The use of the battery carrier is best illustrated in Figures 3–6. In Figures 3 and 4 there is shown a battery B having terminals T which are offset with respect to the longitudinal axial plane through the center of gravity of the battery. Such displacement can best be seen in the end elevation view of Figure 4. When the terminal grips 12 are connected to the terminals T so that the battery is suspended from the carrier, the construction and arrangement of the battery carrier is such, and the lateral offset of the connecting portions 26 is such, that the support members 32 and the handle 30 are then disposed substantially in the longitudinal axial plane through the center of gravity of the battery, as can best be seen in Figure 4. The carrier thereby provides means for carrying the battery B upright without any tipping or spilling of acid from the battery.

In Figures 5 and 6 there is shown a battery B′ having terminals T′. In Figures 5 and 6 the terminals T′ are located in a plane that is not only offset with respect to the longitudinal axial plane through the center of gravity of the battery, in the manner as shown in Figures 3 and 4, but it will be also seen that both of the terminals T′ are located, as shown in Figure 5, to the left of the center of gravity of the battery. In other words, the terminals T′ are also offset with respect to a transverse axial plane through the center of gravity of the battery. Figure 6 shows the arrangement of the support members 32 and 30 when the battery carrier is being utilized in carrying a battery of this latter type.

The elongated handle 30 of the battery carrier is of a length that is greater than the spacing between the battery teminals T of Figures 3 and 4, and between the terminals T′ of Figures 5 and 6. Furthermore, the length of the handle 30 is such that when the terminal grips 12 are connected to the terminals T′, as shown in Figures 5 and 6, then a portion of the handle 30 extends laterally a sufficient distance so as to dispose a portion thereof, which is adapted to be manually grasped, above the center of gravity of the battery. With respect to the arrangement in Figures 5 and 6, when the hand-grasp portion, which is located above the center of gravity, is being gripped, the left hand support member 32 is in abutting relation to the stop 42 at one end of the handle 30, thereby limiting further sliding movement between the handle 30 and said support member 32. Incidentally, the stop member 42 at the right hand end of the handle 30 provides for cooperation with one's hand, permitting of better gripping of the handle when in the position shown in Figures 5 and 6.

In Figures 3, 4, 5 and 6 the centers of gravity, and the direction in which forces are applied to the handle 30, are designated by means of the vector arrows there shown.

It will be seen that the sliding pivotal connection between the terminal grippers 12 and the support members 32 permits of accommodating minor variations that might occur with respect to the spacings of the terminals T from the plane through the center of gravity of the battery. Furthermore, the battery carrier is so constructed and arranged that the battery terminal grippers 12 are disposed substantially horizontally, as best seen in Figures 4 and 6, when they are connected to the terminals of a battery, while the connecting portions of said grippers 12 extend toward a plane through the center of gravity of the battery, so that the remainder of the carrier is disposed substantially in the vertical plane through the center of gravity of the battery.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A battery carrier for carrying batteries having terminals thereon located in a vertical plane that is displaced from a vertical plane passing through the center-of-gravity of the battery, said battery carrier comprising, in combination, a pair of battery-terminal gripper means each having a terminal gripping portion and a connecting portion, said terminal gripping portions, when in operative terminal gripping position, being substantially horizontally disposed and having the centers thereof located in a first vertical plane, and each of said connecting portions being laterally offset in the same direction from said first vertical plane and extending to a point wherein said connecting portions *lie* [line] in a substantially vertical plane passing through the center-of-gravity of the battery, an elongated rigid handle and a pair of elongated depending support members which, when in said operative terminal gripping position, are located in a second vertical plane which passes through the center-of-gravity of the battery and which is spaced from said first vertical plane, *means attaching each of said support members at the lower end thereof to the said portion of the connecting portion of a terminal gripper means which lies in a substantially vertical plane passing through the center-of-gravity of the battery, said attaching means being operative to prevent rotation of said battery-terminal gripping means relative to said depending support members in a substantially horizontal plane when said battery-terminal gripping means are in operative terminal gripping position, said elongated depending support members being connected at their upper ends to said handle and being non-rotatable about their longitudinal axes relative to said handle,* [said support members each attached at the lower end thereof to the connecting portion of a terminal gripper means and being connected at the upper end to said elongated handle,] and said arrangement of handle, support members and terminal grippers providing that when said terminal gripping portions are caused to grip battery terminals which are offset from a plane through the center-of-gravity of the battery, then said offset connecting portions extend toward said center-of-gravity plane so that said handle and support members of the carrier are disposed substantially in said center-of-gravity plane.

2. A battery carrier for carrying batteries having terminals thereon located in a vertical plane that is displaced from a vertical plane passing through the center-of-gravity of the battery, said battery carrier comprising, in combination, a pair of battery-terminal gripper means each having a terminal gripping portion and a connecting portion, said terminal gripping portions, when in operative terminal gripping position, being substantially horizontally disposed and having the centers thereof located in a first vertical plane, and each of said connecting portions being laterally offset in the same direction from said first vertical plane and extending to a point wherein said connecting portions [line] *lie* in a substantially vertical plane passing through the center-of-gravity of the battery, an elongated rigid handle and a pair of elongated depending support members which, when in said operative terminal gripping position, are located in a second vertical plane which passes through the center-of-gravity of the battery and which is spaced from said first vertical plane, *means attaching each of said support members at the lower end thereof to said portion of the connected portion of a terminal gripper means which lies in a substantially vertical plane passing through the center-of-gravity of the battery, said attaching means being operative to prevent rotation of said battery-terminal gripping means relative to said depending support members in a substantially horizontal plane when said battery-terminal gripping means are in operative terminal gripping position, said elongated depending support members being slidably connected at their upper ends to said elongated handle to permit of movement of said support members toward and away from each other on said handle, and said support members being non-rotatable about their longitudinal axes relative to said handle,* [said support members each attached at the lower end thereof to the connecting portion of a terminal gripper means and being slidably connected at the upper end to said elongated handle to permit of movement of said support members toward and away from each other on said handle,] said arrangement of handle, support members and terminal grippers providing that when said terminal gripping portions are caused to grip battery terminals which are offset from a plane through the center-of-gravity of the battery, then said offset connecting portions extend toward said center-of-gravity plane so that said handle and support members of the carrier are disposed substantially in said center-of-gravity plane, and said rigid handle being of a length greater than the spacing of battery terminals which said terminal grippers are adapted to engage.

3. A battery carrier for carrying batteries having terminals thereon located in a vertical plane that is displaced from a vertical plane passing through the center-of-gravity of the battery, said battery carrier comprising, in combination, a pair of battery-terminal gripper means each having a terminal gripping portion and a connecting portion, said terminal gripping portions, when in operative terminal gripping position, being substantially horizontally disposed and having the centers thereof located in a first vertical plane, and each of said connecting portions being laterally offset in the same direction from said first vertical plane and extending to a point wherein said connecting portions [line] *lie* in a substantially vertical plane passing through the center-of-gravity of the battery, an elongated rigid handle and a pair of elongated depending support members which, when in said operative terminal gripping position, are located in a second vertical plane which passes through the center-of-gravity of the battery and which is spaced from said first vertical plane, *means attaching each of said support members at the lower end thereof to said portion of the connected portion of a terminal gripper means which lies in a substantially vertical plane passing through the center-of-gravity of the battery, said attaching means being operative to prevent rotation of said battery-terminal gripping means relative to said depending support members in a substantially horizontal plane when said battery-terminal gripping means are in operative terminal gripping position, said elongated depending support members being slidably connected at their upper ends to said elongated handle to permit of movement of said support members toward and away from each other on said handle, and said support members being non-rotatable about their longitudinal axes relative to said handle,* [said support members each attached at the lower end thereof to the connecting portion of a terminal gripper means and being slidably connected at the upper end to said elongated handle to permit of movement of said support members toward and away from each other on said handle,] said arrangement of handle, support members and terminal grippers providing that when said terminal gripping portions are caused to grip battery terminals which are offset from a plane through the center-of-gravity of the battery, then said offset connecting portions extend toward said center-of-gravity plane so that said handle and support members of the carrier are disposed substantially in said center-of-gravity plane, said rigid handle being of a length greater than the spacing of battery terminals which said terminal grippers are adapted to engage, said elongated handle providing that when both terminals of a battery are offset with respect to only one of two perpendicular planes through the battery's center of gravity, then a portion of the handle between the support members is disposed above said center of gravity, and when said both terminals of a battery are offset with respect to both of two perpendicular planes through the battery's center of gravity, then a portion of the handle disposed laterally of both support members, is disposed above said center of gravity.

4. A battery carrier for carrying batteries having terminals thereon located in a vertical plane that is displaced from a vertical plane passing through the center-of-gravity of the battery, said battery carrier comprising, in combination, a pair of battery-terminal gripper means each having a terminal gripping portion and a connecting portion, said terminal gripping portions, when in operative terminal gripping position, being substantially horizontally disposed and having the centers thereof located in a first vertical plane, and each of said connecting portions being laterally offset in the same direction from said first vertical plane and extending to a point wherein said connecting portion *lie* [line] in a substantially vertical plane passing through the center-of-gravity of the battery, an elongated rigid handle and a pair of elongated depending support members which, when in said operative terminal gripping positions, are located in a second vertical plane which passes through the center-of-gravity of the battery and which is spaced from said first vertical plane, *means attaching each of said support members at the lower end thereof to said portion of the connected portion of a terminal gripper means which lies in a substantially vertical plane passing through the center-of-gravity of the battery, said attaching means being operative to prevent rotation of said battery-terminal gripping means relative to said depending support members in a substantially horizontal plane when said battery-terminal gripping means are in operative terminal gripping position, said elongated depending support members being slidably connected at their upper ends to said elongated handle to permit of movement of said support members toward and away from each other on said handle, and said support members being non-rotatable about their longitudinal axes relative to said handle,* [said support members each attached at the lower end thereof to the connecting portion of a terminal gripper means and being slidably connected at the upper end to said elongated handle to permit of movement of said support members toward and away from each other on said handle,] said arrangement of handle, support members and terminal grippers providing that when said terminal gripping portions are caused to grip battery terminals which are offset from a plane through the center-of-gravity of the battery, then said offset connecting portions extend toward said center-of-gravity plane so that said handle and support members of the carrier are disposed substantially in said center-of-gravity plane, said rigid handle being of a length greater than the spacing of battery terminals which said terminal grippers are adapted to engage, said support members being pivotable about the longitudinal axis of said handle, the attachment of each support member to the connecting portion of a terminal gripper providing for pivotal movement therebetween about an axis substantially parallel to the longitudinal axis of said handle, and stop means at the ends of said elongated handle for limiting sliding movement of said support members.

*5. A battery carrier for carrying batteries having terminals thereon located in a vertical plane that is displaced from a vertical plane passing through the center-of-gravity of the battery, said battery carrier comprising, in combination, a pair of battery-terminal gripper means each having a terminal gripping portion and a connecting portion, said terminal gripping portions, when in operative terminal gripping position, being substantially horizontally disposed and having the centers thereof located in a first vertical plane, and each of said connecting portions being laterally offset in the same direction from said first vertical plane and extending to a point wherein said connecting portions lie in a substantially vertical plane passing through the center-of-gravity of the battery, handle means defining a hand-grasp portion and a pair of elongated depending support portions which, when in said operative terminal gripping position, are located in a second vertical plane which passes substantially through the center-of-gravity of the battery and which is spaced from said first vertical plane, means attaching each of said depending support portions at the lower end thereof to the said portion of the connecting portion of a terminal gripper means which lies in a substantially vertical plane passing through the center-of-gravity of the battery, said attaching means being operative to prevent rotation of said battery-terminal gripping means relative to said depending support portions in a substantially horizontal plane when said battery-terminal gripping means are in operative terminal gripping position, said elongated de-*

*pending support portions being connected at their upper ends to said hand-grasp portion and being non-rotatable about their longitudinal axes relative to said hand-grasp portion, and said arrangement of handle means and terminal grippers providing that when said terminal gripping portions are caused to grip battery terminals which are offset from a plane through the center-of-gravity of the battery, then said offset connecting portions extend toward said center-of-gravity plane so that said handle means of the carrier are disposed substantially in said center-of-gravity plane.*

References Cited in the file of this patent or the original patent

UNITED STATES PATENTS

| | | |
|---|---|---|
| 884,434 | Walgamott | Apr. 14, 1908 |
| 941,072 | Huber | Nov. 23, 1909 |
| 1,267,659 | Gries | May 28, 1918 |
| 1,628,563 | Taylor | May 10, 1927 |
| 1,671,812 | Chase | May 29, 1928 |
| 1,753,396 | Witkowski et al. | Apr. 8, 1930 |
| 1,758,480 | Timmons | May 13, 1930 |
| 1,822,102 | Lidke | Sept. 8, 1931 |
| 1,915,197 | Morgan | June 20, 1933 |
| 2,105,349 | Dawson | Jan. 11, 1938 |
| 2,181,400 | Goldman | Nov. 28, 1939 |
| 2,253,417 | Clark | Aug. 19, 1941 |
| 2,503,005 | Speaker | Apr. 4, 1950 |
| 2,503,794 | Brown | Apr. 11, 1950 |
| 2,697,630 | Roberts | Dec. 21, 1954 |
| 2,720,412 | Kull | Oct. 11, 1955 |
| 2,756,092 | Grympa | July 24, 1956 |
| 2,794,666 | Bishman | June 4, 1957 |